United States Patent [19]

Heck

[11] Patent Number: 4,891,181

[45] Date of Patent: Jan. 2, 1990

[54] APPARATUS FOR CONTROLLED COMBUSTION OF IGNITABLE HYDROGEN-AIR MIXTURES IN THE CONTAINMENT OF WATER-COOLED NUCLEAR REACTOR PLANTS

[75] Inventor: Reinhard Heck, Hanau, Fed. Rep. of Germany

[73] Assignee: Siemens Aktiengesellschaft, Munich, Fed. Rep. of Germany

[21] Appl. No.: 191,274

[22] Filed: May 6, 1988

[30] Foreign Application Priority Data

May 8, 1987 [DE] Fed. Rep. of Germany ....... 3715469

[51] Int. Cl.$^4$ .............................................. G21C 9/00
[52] U.S. Cl. ..................................... 376/300; 361/253
[58] Field of Search ......................... 376/300, 301, 283; 423/580; 431/27, 258, 264; 361/257, 253

[56] References Cited

U.S. PATENT DOCUMENTS

| | | | |
|---|---|---|---|
| 2,856,564 | 10/1958 | Derwin | 315/205 |
| 3,307,913 | 3/1967 | Chave | 376/300 |
| 3,598,699 | 8/1971 | Hartman, Jr. et al. | 376/300 |
| 3,658,996 | 4/1972 | Frumerman et al. | 376/300 |
| 3,740,313 | 6/1973 | Moore et al. | 376/300 |
| 3,818,277 | 6/1974 | Gersing | 431/27 |
| 3,824,432 | 7/1974 | Gersing | 431/27 |
| 4,139,603 | 2/1979 | Weems et al. | 376/300 |
| 4,425,495 | 1/1984 | Cake et al. | 431/262 |
| 4,452,582 | 6/1984 | Portasik | 431/27 |
| 4,741,879 | 5/1988 | McLean et al. | 376/301 |

FOREIGN PATENT DOCUMENTS

| | | | |
|---|---|---|---|
| 2016800 | 10/1970 | Fed. Rep. of Germany . | |
| 2239952 | 4/1973 | Fed. Rep. of Germany . | |
| 3004677 | 8/1981 | Fed. Rep. of Germany . | |
| 2198095 | 3/1974 | France . | |
| 0152224 | 11/1981 | German Democratic Rep. | 376/283 |

OTHER PUBLICATIONS

"Nuclear Engineering Handbook", Etherington, pp. 13–68, 69, 11/58.

Primary Examiner—Daniel Wasil
Attorney, Agent, or Firm—Herbert L. Lerner; Laurence A. Greenberg

[57] ABSTRACT

An apparatus for the controlled combustion of ignitable hydrogen-air mixtures in the containment of water-cooled nuclear reactor plants includes at least one ignition source having a self-sufficient energy reservoir with a charge status being monitorable at regular time intervals. A tripping element of the ignition source responds as a function of temperature for tripping an ignition process and triggering a discharge of the energy reservoir in the ignition source during a predetermined period of time.

4 Claims, 2 Drawing Sheets

APPARATUS FOR CONTROLLED COMBUSTION OF IGNITABLE HYDROGEN-AIR MIXTURES IN THE CONTAINMENT OF WATER-COOLED NUCLEAR REACTOR PLANTS

The invention relates to an apparatus for controlled combustion of ignitable hydrogen-air mixtures in the containment of water-cooled nuclear reactor plants, having at least one ignition source.

After a major malfunction, ignitable hydrogen-air mixtures can occur in the containment of light water reactors. The term "major malfunction" is understood to mean a core meltdown, which in modern light water reactors is highly improbable. A preliminary stage of such an event occurred in the United States, in the Three Mile Island accident. The superheating of the fuel assemblies that occurred in the upper region of the core came to a stop, and it was possible to eliminate a large quantity of hydrogen gas which was enclosed in the containment, without danger to neighboring areas. If such gas mixtures with high $H_2$ concentrations are ignited in an uncontrolled manner, the reactor containment is additionally subjected to explosion pressure and explosion temperature. Purposeful ignition of the $H_2$-air mixtures beforehand, at low $H_2$ concentration, minimizes these strains and prevents leakage from the containment.

Proposals on how to eliminate undesirable $H_2$ quantities in the containment have been made for a long time. German Published, Non-Prosecuted Application DE-OS No. 22 39 952, which corresponds to U.S. Pat. No. 4,139,603 discloses an apparatus of a different generic type, in which a recombination apparatus for combining hydrogen and oxygen to make water is disposed in the containment. The two gases reacting with one another are heated to the suitable reaction temperature of at least 620° C., and preferably 760° C. Such recombinators occupy a relatively large amount of space.

Therefore, more compact exhaust gas combustion systems for nuclear reactors, known as plug burners, have also already been developed, as seen from German Published, Non-Prosecuted Application DE-OS No. 20 16 800, which corresponds to U.S. Pat. No. 3,598,699 for example. In such systems, $H_2$ and $O_2$ are carried through sintered, porous copper plates penetrated by cooling tubules and combust on and in these porous copper plates. An inflow chamber and an outflow chamber (where the steam condenses) are blocked from the outside and from one another by such sintered porous, cooled copper plates. This water-cooled burner requires at least one ignition source. It is particularly suitable for boiling water reactor plants, where quantities of hydrogen that must be eliminated are produced not only in the case of a malfunction but during normal operation as well, because of radiolysis.

It is known from German Pat. No. DE-PS 30 04 677 C2 to place ignition sources in all regions of the containment in which hydrogen can occur, these sources being disposed in a grid pattern with a spacing dependent on the potential danger in the particular region. According to German Published, Non-Prosecuted Application DE-OS No. 20 16 800, a plurality of ignition sources having a plurality of burners are also provided, and must naturally also function in the event of a major malfunction. With this intrinsically self-evident provision, glow plugs, spark plugs or catalytic ignition sources are used as the ignition sources. Catalytic ignition sources tend to become dirty and therefore pose the particular problem regarding whether or not they will in fact function in an emergency. Glow plugs and spark plugs must be supplied with energy through a cable, which as a rule leads from the emergency current supply, but this can also fail in this kind of malfunction.

It is accordingly an object of the invention to provide an apparatus for controlled combustion of ignitable hydrogen-air mixtures in the containment of water-cooled nuclear reactor plants, which overcomes the hereinafore-mentioned disadvantages of the heretofore-known devices of this general type and which ensures that a cableless energy supply is adequate and that its ability to function is absolutely assured in the event of a malfunction.

With the foregoing and other objects in view there is provided, in accordance with the invention, an apparatus for the controlled combustion of ignitable hydrogen-air mixtures in the containment of water-cooled nuclear reactor plants, comprising at least one ignition source including a selfsufficient energy reservoir having a charge status being monitorable at regular time intervals, and a tripping element responding as a function of temperature for tripping an ignition process and triggering a discharge of the energy reservoir in the ignition source during a predetermined period of time.

The term "self-sufficient" is understood to mean that the energy reservoir needs no supply leads, whether cables or other energy supply lines, thereby eliminating any dependency on a remote energy reservoir. Instead, the energy reservoir is associated directly with the ignition source. If the energy reservoir is a dry battery, then electrical remote monitoring of its charge status is simple o accomplish. However, it is also possible for the charge status to be represented in readily visible fashion by means of a small glow lamp at the location of the ignition source.

In accordance with another feature of the invention, the at least one ignition source is a high-voltage ignition unit, the energy reservoir is a dry battery having a current circuit, and the ignition unit also includes a spring-loaded switch connected in the current circuit of the dry battery, a high-voltage module connected to the switch, a charge capacitor connected to the module, and a spark igniter connected to the charge capacitor, the tripping element being associated with the switch for closing the switch in a response situation. Such high-voltage ignition units are already available on the market in many forms, for instance for electronic flash units. The aforementioned elements, except for the trip element responding as a function of temperature, must be housed and wired inside a housing, in particular a metal housing, in such a way that they are protected against moisture, pressure and temperature. The wall of the housing is penetrated only by the spark igniter, a switch pin and possibly test jacks (for monitoring the charge of the dry battery).

In accordance with a further feature of the invention, the tripping element is part of a fast-response sprinkler element having a surface, wall, skin or membrane bursting upon attainment of a threshold temperature value for releasing or uncovering and discharging the energy reservoir for closing the spring-loaded switch.

Alternatively, or redundantly to the sprinkler tripping, in accordance with an added feature of the invention, the temperature-resistant tripping element is a bimetallic device operating or releasing or uncovering and closing the springloaded switch upon attainment of a threshold temperature value.

Particular attention must be devoted to assuring that the energy reservoir in general, and the dry battery in particular, function satisfactorily, that is over a period of approximately 4 to 5 days, even at higher temperatures on the order of 200° C.

In accordance with an additional feature of the invention, the dry battery is a lithium collector. Lithium collectors are particularly favorable energy reservoirs, because they are capable of handling such temperature loads. A lithium chloride cell, for example, is an electrochemical secondary element having a considerably greater specific energy density and charge density than conventional batteries. The lithium chloride cell for instance includes an annular, porous special steel anode, with liquefied lithium in the pores of the anode, and a cylindrical, likewise porous graphite cathode protruding into the anode ring and through which chlorine diffuses during the discharge process, with liquefied lithium chloride located between the two as an electrolyte.

In accordance with yet another feature of the invention, the at least one ignition source includes at least one piezoelectric crystal having two poles, means for supporting the at least one piezoelectric crystal to permit pressure loading, and a spark igniter connected to the poles, the energy reservoir including a device for exerting periodic pressure loads upon the at least one piezoelectric crystal in a response situation.

In accordance with a concomitant feature of the invention, the energy reservoir is a tensible spring element having a reversing mechanism, the reversing mechanism converting tensile, compressive or rotational forces of the spring element into clocking stroke movements of a pressure pad engaging the at least one piezoelectric crystal.

Other features which are considered as characteristic for the invention are set forth in the appended claims.

Although the invention is illustrated and described herein as embodied in an apparatus for controlled combustion of ignitable hydrogen-air mixtures in the containment of water-cooled nuclear reactor plants, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 4:
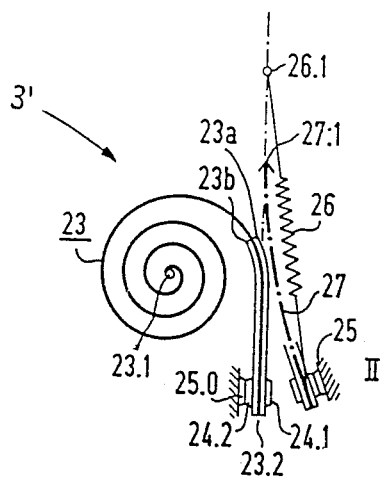
Figure 5:
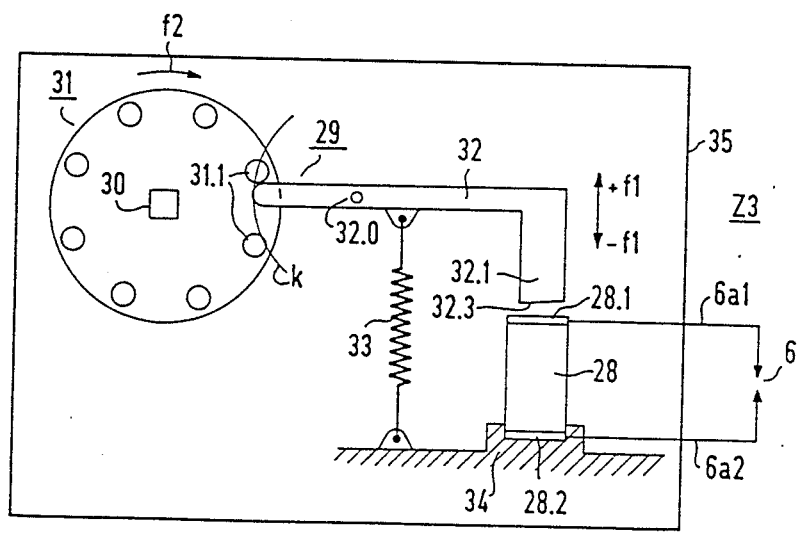

FIG. 4 is an elevational view of a bimetallic device which can also serve as a temperature-dependent trip element for initiating the ignition process of the ignition source; and FIG. 5 is a highly simplified and highly diagrammatic and schematic circuit diagram of a piezoelectric ignition source with a piezoelectric crystal which is deformed periodically or in clocking fashion by a clockwork-like mechanism in the response situation and is therefore made to furnish the ignition spark.

Figure 1:
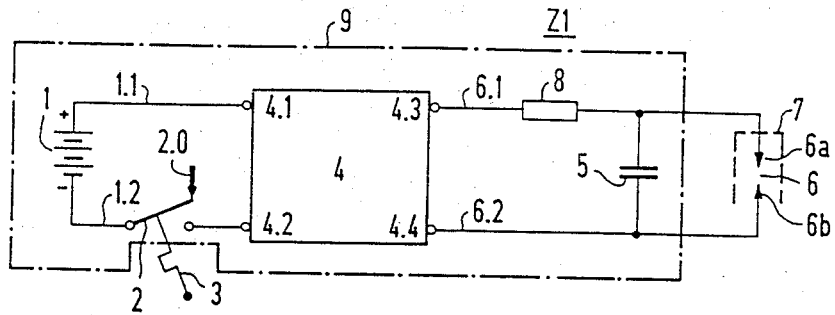
FIG. 1 is a schematic circuit diagram of a basic embodiment of a simple ignition source having a dry battery, a high-voltage module and a spark igniter, in which the tripping of a spring-loaded switch is effected by a sprinkler element.

Referring now to the figures of the drawings in detail and first, particularly, to FIG. 1 thereof, it is seen that a positive lead 1.1 and a negative lead 1.2 of a dry battery 1 such as a lithium collector are connected to input terminals 4.1, 4.2 of a high-voltage module 4. A spring-loaded switch 2 which is also incorporated in the negative lead 1.2 is put into operative connection with the trip element 3 of a non-illustrated fast-response sprinkler. Two ignition electrodes 6a, 6b of an electric spark igniter 6 having a spark gap therebetween are connected through respective electrical high-voltage leads 6.1 and 6.2 to respective positive and negative output terminals 4.3 and 4.4 of the high-voltage module 4. A charge resistor 8 is also disposed in the lead or lead segment 6.1, and the two leads 6.1, 6.2 are joined to one another between the charge resistor and the spark igniter 6 by a charge capacitor 5. The spark igniter 6 is provided with a splash protector 7. As the drawing shows, all of the components of the ignition source represented overall by reference symbol Z1, except for the trip element 3 of the sprinkler element; a switch pin belonging to the trip element 3 and the spark igniter 6, are housed and wired inside a metal housing 9 so as to be protected against moisture, pressure and temperature. The only penetration through the wall of the metal housing is a pressure-proof and moisture-proof penetration by the electrical supply leads of the spark igniter 6, the aforementioned switch pin of the trip element, and possibly test jacks (for monitoring the charge of the dry battery). A practical embodiment of the ignition source Z1 occupies a volume of approximately 2 dm$^3$; for example (1 dm$^3$ = 1 volume). In the trip situation, that is if the trip element 3 responds, the spring-loaded switch 2 is shifted into its closing position by a spring represented by a black arrow 2.0, and the high-voltage module 4 is supplied with direct current by the dry battery 1. The high voltage generated in this high-voltage module 4 is picked up by the external ignition circuit at the terminals 4.3, 4.4 and generates a sawtooth high ignition voltage at the two ignition electrodes 6a, 6b through the RC combination 8, 5. The clock time may amount to several minutes, because a certain amount of time passes before an ignitable mixture is again present after burning off a volume of hydrogen. The battery 1 has a capacity enabling the clocking ignition processes to extend over several days. The high-voltage module 4 is an electronic component, which transforms the voltage of the low-voltage dry battery 1 to the required spark voltage. It converts the direct current into a transformable pulse current. In principle, the ignition source Z1 of FIG. 1 could also be a mechanical contact breaker instead of an electronic contact breaker.

Figure 2:
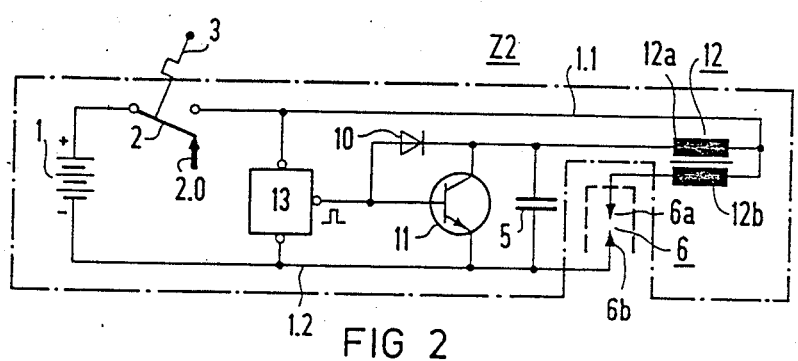
FIG. 2 is a circuit diagram of a variant of the ignition source of FIG. 1 having a clock generator, a protection diode and a high-voltage ignition transformer.

In the ignition source Z2 of FIG. 2, some switch elements of the high-voltage module are shown in further detail, and only a clock generator 13 is symbolized in the form of a block. In the event of a closure of the switch 2, if the trip element 3 of the sprinkler element has responded, the clock generator 13 emits a pulse train to a high-voltage transistor 11 connected downstream thereof. A protection diode 10 is also connected in parallel with the base-to-collector path of the transistor 11. A primary winding 12a of an ignition transformer 12 is incorporated into the circuit path between the positive lead 1.1 and the negative lead 1.2 of the dry battery 1. When the transistor 11 is conductive, the primary winding 12a passes direct battery current through the emitter-to-collector path of the transistor 11 to store inductive energy. If the transistor 11 is blocked by a corresponding base biasing, then a high ignition voltage is induced in a secondary high-voltage winding 12b, and the ignition voltage discharges in the form of ignition sparks at the spark gap of the spark igniter 6. The transistor 11 functions similar to that of a transistor or solid state ignition in a motor vehicle.

Figure 3:
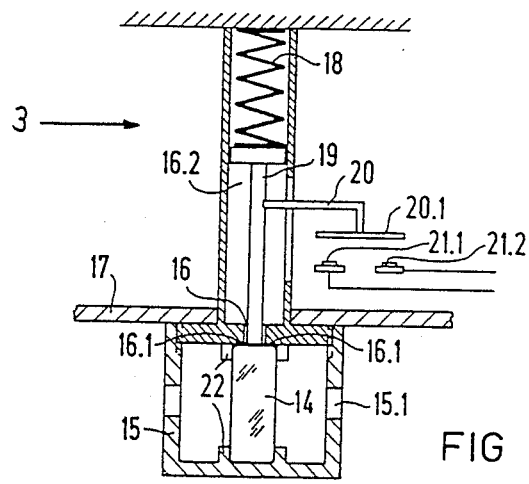
FIG. 3 is a fragmentary, diagrammatic, cross-sectional view of the sprinkler head of a fast-response sprinkler having a glass bulb which bursts when the threshold temperature is reached, and a spring-loaded switch with a contact bridge that is coupled with a trip tappet of the sprinkler element.

As already indicated, it is particularly advantageous to make joint use of the trip element of an automatic sprinkler system. In sprinkler systems used as automatic fire-extinguishing systems, sprinkler nozzles for sprinkling extinguishing means in the form of water, are distributed over the rooms or spaces to be protected, in order to fight fires with these systems as soon as they break out. The systems are tripped by the heat of a fire at the location of the system, because the heat destroys the stopper of a sprinkler nozzle or sprinkler head. Hot gas-steam mixtures which are present in a containment in the event of a malfunction, are also possible sources of tripping heat to be used according to the invention. The sprinkler nozzle stoppers are formed of either melting solder or glass bulbs, and can be manufactured for various tripping temperatures. Normally, the tripping temperature is selected in such a way that it is 50K above normal room temperature. FIG. 3 diagrammatically shows a trip element 3 of a sprinkler element having a cylindrical glass bulb 14 with a surface, wall, skin or membrane which is pressed against seating surfaces 16.1 at an opening 16 in a wall 17 of a sprinkler container, by a screw cap 15. The screw cap 15 may be open in the form of a basket or cage, or it may have convection openings 15.1 such as on the side thereof. Protruding through the opening 16 and a conduit 16.2 is a tappet 19 that is spring-loaded by a helical compression spring 18. A contact bridge holder 20 having a movable contact bridge 20.1 is secured on the tappet 19. Fixed contacts 21.1 and 21.2 are located opposite the movable contact bridge 20.1. The fixed contacts 21.1-21.2 may form the openable and closable contact path of the spring-loaded switch 2 of FIG. 1 or FIG. 2, in cooperation with the movable contact bridge 20.1. The glass bulb 14, which is retained in annular bodies 22 and guided at the two ends thereof, explodes if the response temperature is attained, permitting the tappet 19 to be shifted by the spring 18 in the direction toward the interior of the screw cap 15, which causes the movable contact bridge 20.1 to be pressed against the two fixed contacts 21.1, 21.2. The conduit 16.2 and the uncovered opening 16 thus normally serve to introduce extinguishing water under pressure from a non-illustrated sprinkler reservoir, which emerges to the outside in the form of a spreading conical extinguishing streak through nozzle openings in the screw cap. However, in this case the sprinkler element shown is converted into the ignition source Z1 or Z2. The extinguishing function of other non-illustrated fast-response sprinklers of the conventional type, in which the cap 15 serves as a sprinkler head, is naturally retained.

A bimetallic device 3' shown in FIG. 4 can also be used as a temperature-dependent trip element for the spring-loaded switch 2. The inner end 23.1 of a bimetallic spiral 23 serves as both a fastening point and as one switch contact. The free end 23.2 of the bimetallic spiral 23 has a double contact 24.1, 24.2, which rests on an empty contact 25.0 in one position I shown in FIG. 4. An outer metal strip 23a with a relatively greater thermal expansion and an inner metal strip 23b with a relatively lower thermal expansion, are disposed on the bimetallic spiral 23. In the other position II shown in FIG. 4, the bimetallic spiral has warmed up enough so that the free end 23.2 of the bimetallic spiral 23 has stretched somewhat and has thus come to rest against a counter contact 25, due to the greater thermal expansion of the outer metal strip 23a. A sufficient contact pressure and an accentuated switch movement is attained by means of a dead-center spring 26 that is suspended at a point 26.1. The spring engages the free end of a sheet-metal strip 27 that is shown in phantom. The strip 27 is joined to both bimetallic strips 23a, 23b and is supported in knife-edge fashion at reference numeral 27.1. The adjustment is provided in such a way that the two contact positions I and II are stable top-dead-center positions.

In the fifth embodiment of FIG. 5, the use of a dry battery as an energy reservoir can be dispensed with, because at least one piezoelectric crystal 28 is used in an ignition source Z3. The piezoelectric crystal 28 is supported in a pressure-loadable fashion and a spark gap in a spark igniter 6 is connected to two preferably metallized poles 28.1, 28.2 of the piezoelectric crystal 28. The energy reservoir has a device or reversing mechanism 29 for exerting periodic pressure loads on the piezoelectric crystal 28 in the response situation. In the highly simplified embodiment, a cam wheel 31 having cams 31.1 is mounted on a rotable shaft 30 driven by a non-illustrated spiral spring. A pivotable bell crank 32 is pivotably supported at a point 32.0 in accordance with the direction of an arrow ±f1 and a hammer head or pressure pad 32.1 of the bell crank is pulled toward the piezoelectric crystal 28 by a spiral spring 33. The hammer surface that comes into contact with the upper surface of the pole 28.1 of the piezoelectric crystal 28 is somewhat beveled as shown, so that contact over a large area is assured in the contact situation. A pivoting circle k about the pivot axis 32.0 of the bell crank 32 indicates that upon rotation of the cam wheel 31 in the direction of an arrow f2, the bell crank 32 is initially pivoted in the direction +f1, and after a predetermined coupled-travel path, which is approximately equivalent to the distance between two adjacent cams 31.1, the bell crank 32 moves out of engagement with the cams 31.1 and is thus pivoted back again by the tension spring 33 in the direction −f1, far enough so that the hammer surface 32.3 strikes the piezoelectric crystal 28. The next cam in succession then takes the bell crank 32 along with it in coupled travel in the direction +f1 again and so forth, so that a cyclic deformation of the piezoelectric crystal 28 takes place, and corresponding piezoelectric voltages at the spark gap of the spark igniter 6 generate jump sparks. The piezoelectric crystal 28 is thus subjected to pressure periodically. The non-illustrated spring reservoir or loading device for rotating the cam wheel 31 can be provided with a balance wheel or flywheel for evening out the rotation of the cam wheel 31 in clockwork fashion. Advantageously, the spring reservoir should be dimensioned large enough so that it has sufficient reserve capacity to rotate the cam wheel 31 for 4 to 5 days. The piezoelectric crystal 28 is fastened and supported in a pressure-proof bearing 34. One end of the bearing is also engaged by the tension spring 33. The entire reversing mechanism or pressure load exerting device 29 is accommodated in a malfunction-proof housing 35 in a pressure-proof and waterproof manner. Only the spark igniter 6 with the spark gap and the two ignition electrodes thereof is disposed on the outside of the housing 35. Electrical supply leads 6a1, 6a2 of the spark igniter 6 are guided in an insulated and pressure proof manner through the side wall of the housing 35. A polygon or polygonal socket accessible from the outside can also be provided for engagement with a tightening wrench for the non-illustrated spring reservoir or loading device. Discharging of the spring reservoir can be tripped, for example, by a sprinkler tripping element, as explained in conjunction with FIGS. 1–3, or by a bimetallic tripping element as shown in FIG. 4.

I claim:

1. Apparatus for the controlled combustion of ignitable hydrogen-air mixtures in the containment of water-cooled nuclear reactor plants, comprising at least one ignition source in the form of a high-voltage ignition unit including a self-sufficient energy reservoir in the form of a dry battery having a current circuit and having a charge status being monitorable at regular time intervals, said ignition unit also including a spring-loaded switch connected in said current circuit of said dry battery, a high-voltage module connected to said switch, and a charge capacitor connected to said module; a spark igniter connected to said charge capacitor; and a tripping element responding as a function of temperature for tripping an ignition process, said tripping element triggering a discharge of said energy reservoir in said ignition source during a predetermined period of time and said tripping element being associated with said switch for closing said switch in a response situation.

2. Apparatus according to claim 1, wherein said temperature-resistant tripping element is a bimetallic device operating and closing said spring-loaded switch upon attainment of a threshold temperature value.

3. Apparatus according to claim 1, wherein said dry battery is a lithium collector.

4. Apparatus for the controlled combustion of ignition hydrogen-air mixtures in the containment of water-cooled nuclear reactor plants, comprising at least one ignition source in the form of a high-voltage ignition unit including a self-sufficient energy reservoir in the form of a dry battery having a current circuit and having a charge status being monitorable at regular time intervals, said ignition unit also including a spring-loaded switch connected in said current circuit of said dry battery, a high-voltage module connected to said switch (2), and a charge capacitor connected to said module; a spark ignitor connected to said charge capacitor; and a tripping element responding as a function of temperature for tripping an ignition process, said tripping element triggering a discharge of said energy reservoir in said ignition source, during a predetermined period of time and said tripping element being associated with said switch for closing said switch in a response situation, said tripping element being part of a fast-response sprinkler element having a surface bursting upon attainment of a threshold temperature value for releasing and discharging said energy reservoir for closing said spring-loaded switch.

* * * * *